United States Patent
Quatmann et al.

(10) Patent No.: US 9,080,923 B2
(45) Date of Patent: Jul. 14, 2015

(54) METHOD FOR CHECKING THE LEAKPROOFNESS OF SAFETY VALVES

(75) Inventors: Aloys Quatmann, Bakum (DE); Ulrich Engelmann, Osnabrück (DE); Oliver Borgmann, Ibbenbüren (DE)

(73) Assignee: Elster GmbH, Mainz-Kastel (DE)

( * ) Notice: Subject to any disclaimer, the term of this patent is extended or adjusted under 35 U.S.C. 154(b) by 0 days.

(21) Appl. No.: 14/128,589

(22) PCT Filed: Jun. 26, 2012

(86) PCT No.: PCT/EP2012/062378
§ 371 (c)(1),
(2), (4) Date: Feb. 20, 2014

(87) PCT Pub. No.: WO2013/000921
PCT Pub. Date: Jan. 3, 2013

(65) Prior Publication Data
US 2014/0174158 A1 Jun. 26, 2014

(30) Foreign Application Priority Data

Jun. 27, 2011 (EP) .................................... 11171567

(51) Int. Cl.
*G01M 3/28* (2006.01)

(52) U.S. Cl.
CPC .............. *G01M 3/28* (2013.01); *G01M 3/2876* (2013.01)

(58) Field of Classification Search
CPC ....... G01M 3/28; G01M 3/2876; G01M 3/18; G01M 3/025; G01M 3/2815; G01M 3/22; G01M 3/26; G01M 3/086; G01M 3/184; G01M 3/224
USPC ....... 73/40.5 R, 46, 40, 49.8, 37, 40.5 A, 49.7
See application file for complete search history.

(56) References Cited

U.S. PATENT DOCUMENTS

| | | | |
|---|---|---|---|
| 6,057,771 A | 5/2000 | Lakra | |
| 7,418,856 B2 * | 9/2008 | Kohler | 73/49.7 |
| 2011/0008687 A1 * | 1/2011 | Ballantine et al. | 429/410 |

FOREIGN PATENT DOCUMENTS

DE     19831067     1/2000

OTHER PUBLICATIONS

International Preliminary Report on Patentability of PCT/EP2012/062378 dated Jan. 7, 2014.
International Search Report of PCT/EP2012/062378 dated Sep. 17, 2012.
Written Opinion of PCT/EP2012/062378.

* cited by examiner

*Primary Examiner* — Hezron E Williams
*Assistant Examiner* — Marrit Eyassu
(74) *Attorney, Agent, or Firm* — Rankin, Hill & Clark LLP

(57) ABSTRACT

Method for checking the leakproffness of safety valves. Method for testing the leadkproofness of two controllable valves (V1, V2), wherein the vales are arranged at opposite ends of a test volume (10). An inlet pressure pe is present upstream of the test volume, in front of valve V1, and an outlet pressure pa is present downstream of the test volume, behind the valve V2. A control device controls the valves to open and close, and the control device is coupled to at least two pressure switches (26, 27) which are both operatively connected to the test volume (10) in order to monitor the pressure. The first pressure switch is set to a first triggering threshold d1, wherein d1=pe/x, where x>3. The second pressure switch is set to a second triggering threshold d2, wherein d2=pe(1−1/x). A valve is controlled in order to open the valve for a period of time tL1 and then to close said valve. The process then waits for a measurement period tM1 and a first pressure switch is checked. The second valve is then opened and closed again and the second pressure switch is checked. The functionality of the valves is indicated if the method has not been aborted owing to a pressure switch being triggered.

15 Claims, 2 Drawing Sheets

PRIOR ART

METHOD FOR CHECKING THE LEAKPROOFNESS OF SAFETY VALVES

The invention relates to a method for checking the leakproofness of controllable valves in a gas line. In particular, the invention relates to a method for ascertaining leakages in gas valves, which are disposed along a gas line as redundant safety valves.

Various safety regulations and standards stipulate the design and configuration of safety devices on gas lines, such as are used for example in industrial thermoprocessing plants. For example, mention may be made here of the safety requirements on furnaces and fuel handling systems of gas-heated industrial thermoprocessing plants according to DIN EN 746-2. According to such regulations, pre-aeration of a combustion chamber is routinely required before a burner (re)start. There are however permissible exceptions. Thus, pre-aeration is not required for restarting after normal shut-downs, if the burner is equipped with two simultaneously closing valves and a leakproofness checking device (valve monitoring system). The checking of the leakproofness operates as an automatic monitoring system of a line section with shut-off valves, in order to emit a signal for a check when the leakage of one of the valves exceeds the operating limit.

According to the prior art, various approaches to testing leakproofness are known. The valves of corresponding systems are disposed along a gas line, at two different positions, upstream and downstream of a test volume. Both valves are controllable in order to enable blocking or unblocking of the gas passage.

The applicant has long been using various methods to ensure the checking of leakproofness. A pressure switch is usually installed in the gas line between the valves, said pressure switch having a triggering point in the pressure range between the inlet pressure present upstream and the outlet pressure present downstream. A corresponding method from the prior art is explained in greater detail by reference to the drawings.

Moreover, methods are known wherein two pressure switches are installed in the gas line between the valves, which pressure switches can also have different triggering pressures.

The prior art accordingly offers methods for testing the leakproofness at two controllable valves, wherein the valves are disposed at opposite ends of a test volume. On the inlet side, i.e. upstream of the test volume, in front of valve V1, an inlet pressure $p_e$ is present. On the outlet side, i.e. downstream of the test volume, behind valve V2, an outlet pressure $p_a$ is present. In combustion plants, it is the case that the inlet pressure is greater than the outlet pressure, i.e. $p_e > p_a$ and the pressure in the test volume is equal to $p_z$. The size ratio $p_e \geq p_z \geq p_a$ applies.

A control device is coupled with the valves for triggering the opening and closing, the control device being coupled with at least two pressure switches which are both in an operative connection with the test volume for the pressure monitoring.

In a method for checking the leakproofness of gas valves according to publication DE19831067, at least a second gas valve is checked in respect of leakproofness during the start-up and at least a first gas valve is checked during the shut-down of the burner.

U.S. Pat. No. 6,057,771A proposes to monitor a line between two valves with pressure switches in order to detect leakages in the valves. The fluid, which is enclosed in the line when the valves are blocked, leads to a pressure increase in the presence of heating due to ambient heat. If it is not detected, it can be concluded that there is defective blocking of the valves.

A drawback with the known methods, however, consists in their testing times on account of the technical equipment. Especially in the case of large volumes and larger plants, the testing period can take up a considerable amount of time in order on the one hand to apply the inlet pressure to the volume between the valves and on the other hand to release the pressure in the test volume downstream. These procedures are required in order to verify the proper blocking functions of the valves.

The problem of the invention is to provide an improved method for checking leakproofness, which continues to offer a high degree of reliability with a shorter testing time.

This problem is solved by a method with the features of claim 1.

The method according to the invention, of the type mentioned at the outset, pursues an optimised approach to the checking of the leakproofness.

In the first place, the first pressure switch is set to a first triggering threshold $d_1$, wherein $d_1 = p_e/x$ where $x > 2$. Parameter x indicates a fraction of the inlet pressure and can have any arbitrarily value, i.e. does not need to be an integer value.

The second pressure switch is set to a second triggering threshold $d_2$, wherein $d_2 = p_e(1 - 1/x)$. The triggering thresholds are selected essentially symmetrical around half the inlet pressure, one reduced by an amount compared to half the inlet pressure and one increased by the same amount compared to half the inlet pressure. This symmetrical arrangement does not have to be adhered to mathematically exactly in practice, but a suitable value with respective triggering thresholds should be selected within the range of the usual tolerances. The setting can be carried out once, when the system is set up, and does not need to be carried out again each time the method is performed.

Both valves are in the shut-off position at the start of the leakproofness check.

According to the invention, one of the following two groups of steps is alternatively executed, wherein the step sequences contain the same steps, but the latter are executed in a different order. In principle, the two step sequences are therefore equivalent, but an initial selection can, depending on the selected step sequence, produce an additional time-saving.

According to the first step sequence, valve V1 is first triggered in order to open the latter for a period of time $t_{1,1}$ and then to close it again. A measurement period $t_{M1}$ is awaited and the second pressure switch is then checked. If $p_z < d_2$ applies, an inadmissible pressure drop has occurred between valves V1 and V2 and the process is aborted with the recognition of the leakage of valve V2.

If the outcome of the evaluation is that $p_z \geq d_2$, i.e. the pressure in the test section has been held above the triggering threshold of the second sensor, the proper function of valve V2 is established. Triggering of valve V2 then takes place in order to open the latter for a period of time $t_{L2}$ and then to close it. A measurement period $t_{M2}$ is again awaited and then the first pressure switch is checked. If $p_z > d_1$ applies, the process is aborted with the recognition of the leakage of valve V1. In this case, a pressure increase above an inadmissible value has occurred despite the previous pressure release through valve V2.

If however $p_z \leq d_1$ applies, the leakproofness check has been completed successfully.

According to the second step sequence, the process is executed in a different order.

In the first place, valve V2 is triggered in order to open the latter for a period of time $t_{L2}$ and then to close it. After awaiting a measurement period $t_{M2}$, the first pressure switch is checked and the process is aborted if $p_z > d_1$ with the recognition of the leakage of valve V1.

On the other hand, if $p_z \le d_1$, valve V1 is triggered in order to open the latter for a period of time $t_{L1}$ and then to close it. Once again, a measurement period $t_{M1}$ is awaited. The second pressure switch is then checked and if $p_z < d_2$ the process is aborted with the recognition of the leakage of valve V2.

The indication of the functionality of the valves takes place if an abortion of the process has not taken place.

It is essential that measurement periods $t_{M1}$ and $t_{M2}$ according to the method according to the invention can be shortened significantly compared to the known concepts. These measurement periods will as a rule be identical $t_{M1} = t_{M2} = t_M$, since the triggering values of the sensors are selected symmetrically around half the inlet pressure. Due to the fact that two pressure switches are disposed in the test volume between the safety valves, and the latter have different, essentially symmetrical switching points in respect of half the inlet pressure, a more rapid leakproofness test is possible. Thus, according to the invention, if for example the first pressure switch has a triggering threshold which amounts to ¼ of the inlet pressure, the second pressure switch has a value of approx. ¾ of the inlet pressure. It can immediately be seen that the approach of the triggering thresholds to the inlet pressure on the one hand and to the outlet pressure on the other hand enables a higher sensitivity of the detection with the pressure switches.

Inasmuch as a leakage is present in the system, the stated thresholds are exceeded or fallen below more quickly than is the case in the system with a single pressure switch or a plurality of redundant pressure switches. Measurement time $t_M$ can thus be reduced considerably.

The sequence of the steps is preferably determined as a function of the state of the system in the case of each leakproofness check.

A check is first made to establish whether, at the start of the leakproofness check, the first pressure switch indicates that the first triggering threshold has been exceeded, i.e. $p_z > d_1$. In this case, the first step sequence is executed.

If, at the start of the leakproofness check, the first pressure switch indicates that the first triggering threshold has not been exceeded, i.e. $p_z <= d_1$, the second step sequence is executed.

Since, at the start of the process, the sequence of the valve checks is determined depending on the state of the system, a time-saving is also ensured here without adversely affecting the reliability. Depending on the pressure ratios between the valves, the leakproofness of valve VI or on the other hand the leakproofness of valve V2 is checked first. In addition, a check is made by means of one of the pressure switches to establish whether the test volume is more or less at the pressure level of the outlet pressure. If this is the case, the leakproofness of valve V1 lying upstream and acted on by the inlet pressure is checked first. However, if the pressure in the test volume already amounts to a value significantly raised compared to the outlet pressure, the leakproofness of valve V2 located downstream and blocking with respect to the outlet pressure is checked first.

Depending on the selection of the triggering thresholds, a considerable shortening of the measurement period can be achieved, wherein the risk of misrecognitions also arises when the triggering thresholds of the pressure switches approach ever closer to the pressures on the other side of the valves.

It is particularly advantageous, therefore, if the pressure thresholds are set with a certainly parameter $x < 10$ in the method according to the invention. This factor and associated measurement period $t_M$ can be adapted depending on the design of the system and the plant. The larger the factor x is selected, the shorter the measurement period.

It is prescribed by the requirements and technical standards to be complied with that the leakage in a gas-conveying system must not exceed specific limiting values. Measurement time $t_M$ has to be determined taking account of the switching precision of the pressure switches, the volume present between the safety valves, the pressure difference between the inlet and outlet side and the line cross-sections as well as the remaining design of the system. In any event, however, a much quicker process for checking leakproofness is achieved, since the symmetrical selection of the triggering thresholds of the pressure switches signals an excessive increase or decrease in the pressure in the test volume much earlier than in the case of a pressure switch which is set by reason of the function roughly centrally to a pressure value between an inlet value and an outlet value.

It emerges from the wording of claim 1 that the measurement period and the opening times of the valves may be different depending on the valve just switched. Identical measurement periods and opening times can however also be selected for both valves. In this case, the configuration of the system is extremely simple, since only a few parameters have to be set.

The invention will be explained in greater detail with the aid of the appended figures.

FIG. 1 describes a method and a set-up according to the prior art, wherein one pressure switch is used.

Figure 1:
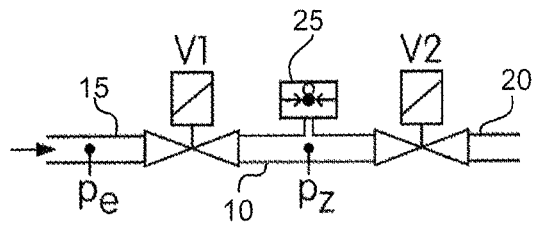

FIG. 1 shows a device for checking the leakproofness of two shut-off valves V1 and V2. A test section 10 is formed between shut-off valves V1 and V2. A supply line 15 is disposed on the inlet side of the device, so that valve VI sits between test section 10 and supply line 15. Valve V2 sits between test section 10 and discharge line 20, which leads to a gas consumer, e.g. a burner arrangement.

An inlet pressure $p_e$ is present in supply line 15. A pressure sensor 25 is coupled with the volume of test section 10. With this device according to the prior art, the switching point the pressure sensor is set to half the inlet pressure $p_e/2$. The pressure present in test section 10 is denoted by $p_z$.

Figure 2:
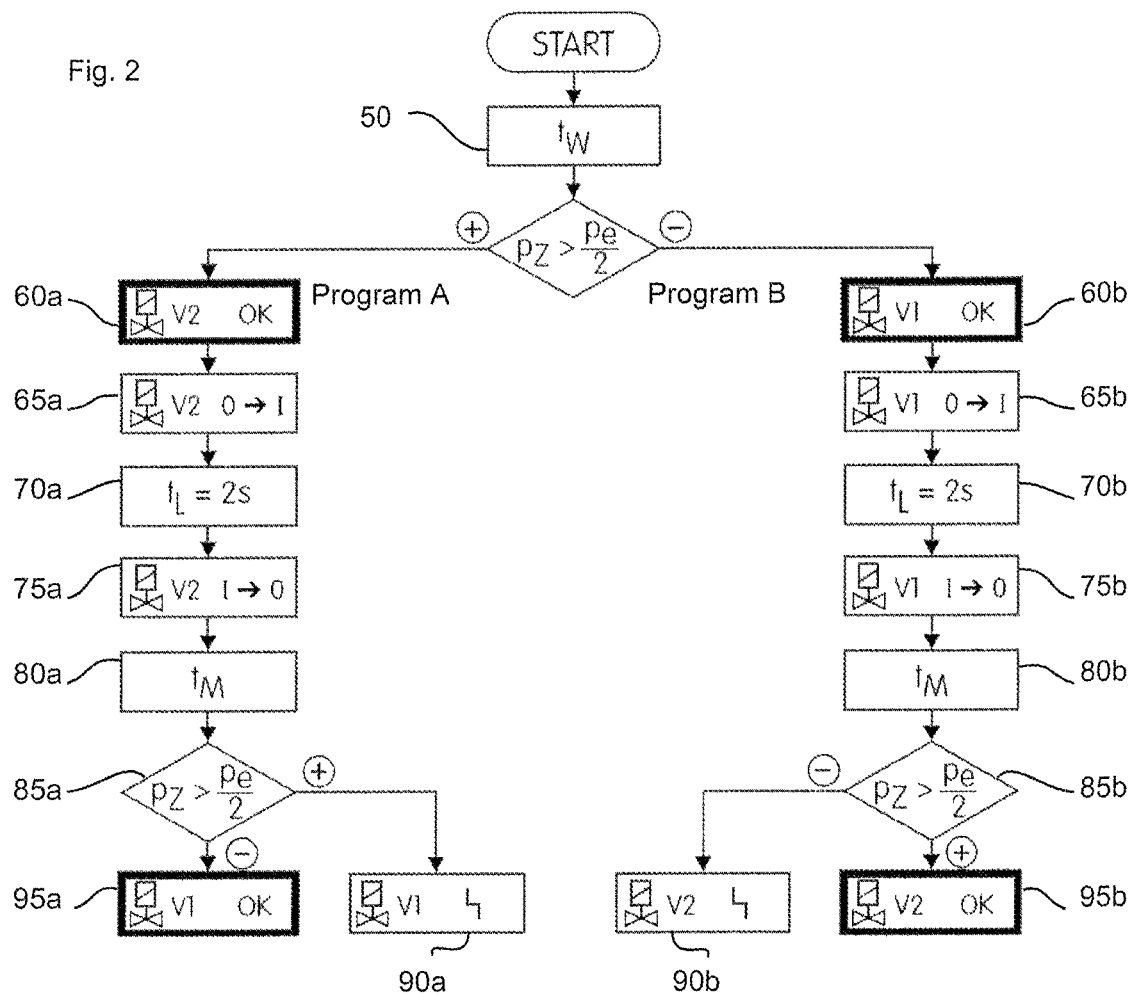
FIG. 2 shows a flow chart of the method with the means from FIG. 1.

FIG. 2 shows the course of a test program, such as can be executed according to the device from FIG. 1. This test procedure according to the prior art takes place in three sections, an initial waiting time, a valve opening time and a testing time.

After the start of the program, a waiting time $t_w$ first elapses in step 50. The status of pressure switch 25 is then checked, and if pressure $p_z$ prevailing in test section is greater than half the inlet pressure $p_e$, program sequence A is continued, and if the pressure is on the other hand not greater than half the inlet pressure, a switch is made into the program branch to program B.

Insofar as the pressure in the test section after the lapse of the waiting time is greater than half the inlet pressure, it is ascertained in step 60a that pressure valve V2 lying downstream of the test section is intact. This valve V2 is triggered in step 65a into the opening position, an opening time $t_L$ of several seconds, here approx. 2 seconds, is then awaited and the valve is triggered again in step 75a into the closed position. In step 80a, measurement time $t_M$ is awaited and then, in step 85a, it is determined whether the pressure in the test section is greater than half the inlet pressure. If this is the case, it is ascertained in step 90a that valve VI is defective, since the pressure increase of the test section has taken place through this valve. If the pressure of the test section continues to be less than half the inlet pressure, the functionality of valve VI is also ascertained in step 95a.

Program B, which is selected when the pressure in the test section initially exceeds half the inlet pressure, runs analogously, but the proper function of valve V1 is first inferred in step 60b. After the opening and closing of valve VI in steps 65b, 70b and 75b, measurement time 80b is completed and then a check is made to establish whether valve V2 satisfies the leakproofness requirements and the pressure in the test section is maintained.

It can be seen that the checking of the leakproofness can take a considerable amount of time based on the use of one pressure switch set to half the inlet pressure, especially when larger volumes have to be tested.

Figure 3:
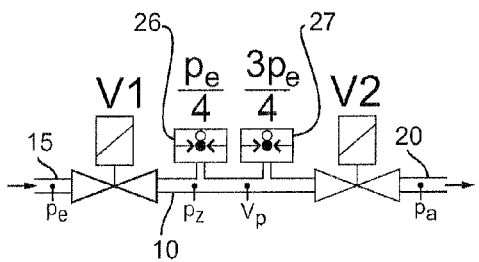
FIG. 3 shows a system set-up for checking leakproofness according to the invention.

According to the invention, therefore, the design shown in FIG. 3 is proposed, which employs two pressure sensors which are set with their switching points symmetrically around half the inlet pressure. In this example, the one pressure sensor 26 is set to a stitching point $p_e/4$, whilst the other pressure sensor 27 is set to the switching point $\frac{3}{4}p_e$.

Figure 4:
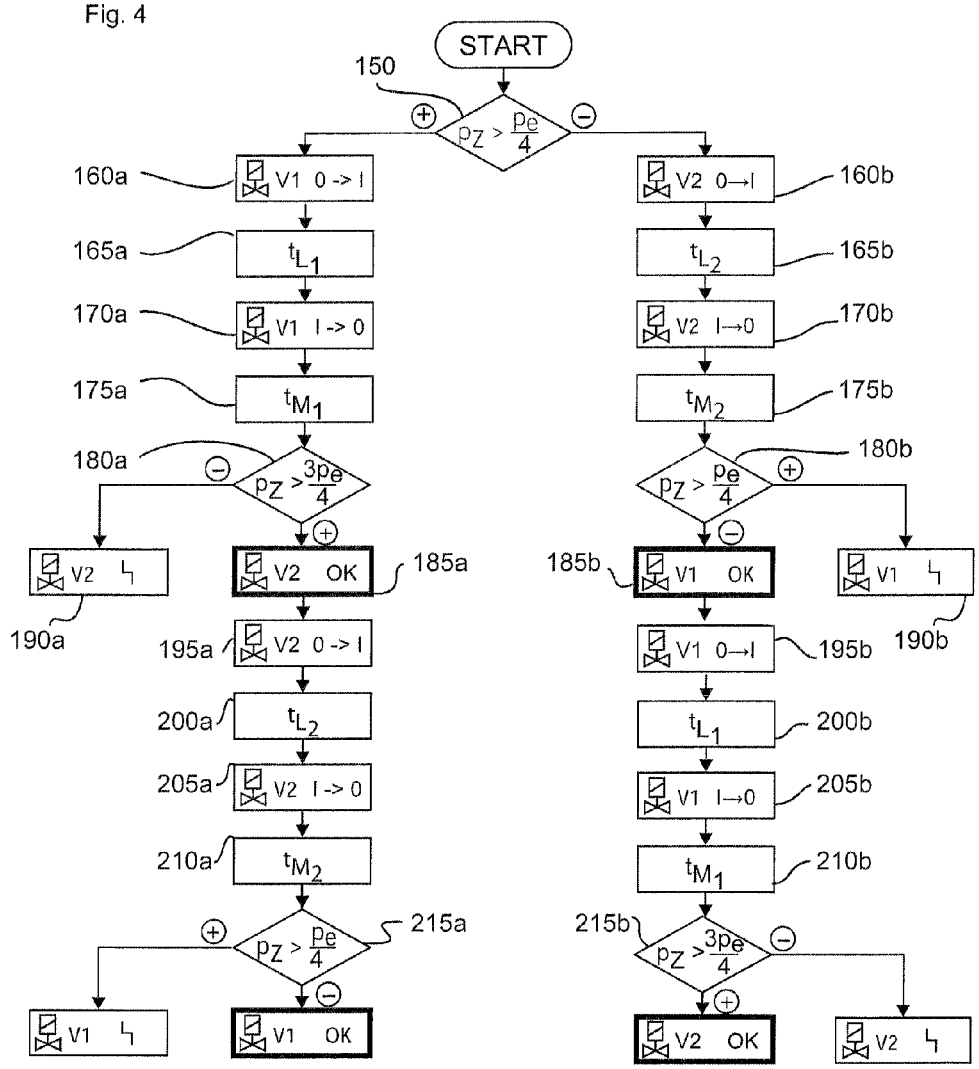
FIG. 4 shows a flow chart of a method according to the invention for the use of the device from FIG. 3.

FIG. 4 shows a corresponding sequence of the method according to the invention. After the start of the method, a check is made in step 150 to establish whether pressure sensor 26 indicates that pressure $p_z$ prevailing in test volume $V_p$ is greater than ¼ of inlet pressure $p_e$. If this is the case, the process is continued in the left-hand branch of the program.

In this case, valve V1 is opened in step 160a, kept open in step 165a for an opening period $t_{L1}$ (e.g. for several seconds) and closed again in step 170a. A measurement period $t_{M1}$ then elapses in step 175a. This measurement period is fixed depending on the design of the device and that the relevant regulations. Depending on the maximum volume flow through the gas supply line, on the inlet pressure and other parameters, it is established with the selection of the measurement period what pressure drop per unit of time is compatible with the statutory regulations. This time-related selection is converted to the switching points of the device which are placed symmetrically around half the inlet pressure. Corresponding methods of calculation are known to the person skilled in the art. Measurement period $t_{M1}$ in step 175a is therefore a much shorter measurement period compared to the measurement period from FIG. 2 in step 80a and 80b, since only a smaller absolute pressure change is monitored. If it is ascertained in step 180a that pressure $p_z$ prevailing in the test volume continues to be greater than ¾ of the inlet pressure, the defect-free function of valve V2 is ascertained at 185a, since a defective valve V2 would have shown a leakage in measurement time $t_M$ with the pressure difference present between $p_z$ and $p_a$, which would have caused pressure $p_z$ to fall below the value of ¾ $p_e$. If the criterion in step 180a is however not satisfied, the malfunction of V2 is ascertained at 190a and the process is ended with an error message.

After step 185a, valve V2 is triggered to open in step 195a and the opening is maintained in step 200a for an opening period $t_{L2}$ (e.g. 2 seconds), in order to enable a pressure equalisation between volume $V_p$ and the outlet side. In step 205a, valve V2 is closed again and a measurement time $t_{M2}$ is awaited in step 210a. It is now established by means of sensor 26 whether the pressure present in the test volume is greater than ¼ of the inlet pressure, which would point to a defective valve V1. However, since the pressure increase of ¼ of the inlet pressure is detected here and not, as described above, of half the inlet pressure, measurement time $t_{M2}$ in step 210a again amounts to much less than measurement time $t_M$ required above in FIGS. 1 and 2.

It needs to be clarified that the shortening of the measurement time with unchanged reliability is due solely to the arrangement of a plurality of pressure sensors which have switching points distributed symmetrically around half the inlet pressure.

The right-hand branch of the process in FIG. 4 is completed when the presence of a low pressure in the test volume has initially been ascertained. The checking of valve V1 is then started and the functionality of valve V2 is checked subsequently. Steps 195a to 210a correspond here to steps 160b to 175b. Steps 195b to 215b, on the other hand, correspond to steps 160a to 180a.

It can be seen that the inventive approach produces a marked shortening of the method of checking leakproofness, without departing from compliance with the safety guidelines or impairing the checking thereof. On the contrary, the system as a whole is more sensitive and reacts to the presence of leakages even more reliably. In view of FIG. 3 and FIG. 4, it is clear to the person skilled in the art that a pressure increase, e.g. in the presence of a non-tight valve V1, in volume $V_p$ to ¼ of the inlet pressure takes place more quickly than from ¼ to ½ of the inlet pressure. The period for a pressure equalisation clearly depends on the difference in the pressures to be equalised. With the described method according to the invention, therefore, an extremely sensitive and reliable check of leakproofness focused on the individual functions of the system can be guaranteed.

The invention claimed is:

1. A method for checking the leakproofness of two controllable valves, wherein the valves are disposed at opposite ends of a test volume, wherein an inlet pressure pe is present upstream of the test volume, in front of valve VI, and wherein an outlet pressure pa is present downstream of the test volume, behind valve V2, where pe>pa and wherein the pressure in the test volume is equal to pz, wherein a control device triggers the valves for the opening and closing and wherein the control device is coupled with at least two pressure switches which are both in an operative connection with the test volume for the pressure monitoring, wherein:

setting the first pressure switch to a first triggering threshold d1, wherein d1=pe/x where x≥3, setting the second pressure switch to a second triggering threshold d2, wherein d2=pe (1-1/x), wherein one of the following two groups of steps is executed with each leakproofness check:

first step sequence:

triggering of valve V1 in order to open the latter for a time period tL1 and then to close it, awaiting a measurement period tM1, checking the second pressure switch and abortion of the process with the recognition of the leakage of valve V2 if pz<d2, triggering of valve V2 in order to open the latter for a time period tL2 and then o close it, awaiting a measurement period tM2, checking the first pressure switch and abortion of the process with the recognition of the leakage of valve V1 if pz>d1;

second step sequence:

triggering of valve V2 in order to open the latter for a time period tL2 and then to close it, awaiting a measurement period tM2, checking the first pressure switch and abortion of the process with the recognition of the leakage of valve V1 if pz>d1, triggering valve V1 in order to open the latter for a time period tL1 and then to close it, awaiting a measurement period tM1, checking the second pressure switch and abortion of the process with the recognition of the leakage of valve V2 if pz<d2, indication of the functionality of the valves if no abortion of the process has taken place.

2. The method according to claim 1, wherein the first step sequence is executed if, at the start of the leakproofness check, the first pressure switch indicates that the first triggering threshold has been exceeded, i.e. Pz>d1, and the second step sequence is executed if, at the start of the leakproofness check, the first pressure switch indicates that the first triggering threshold has not been exceeded, i.e. Pz<=d1.

3. The method according to claim 2, wherein x<10.

4. The method according to claim 3, wherein tM1=tM2 applies to the measurement periods and wherein tL1=tL2 applies to the opening periods.

5. The method according to claim 4, wherein, after the setting of one of the pressure switches, automatic setting of the other pressure switch takes place with an identical parameter x.

6. The method according to claim 3, wherein, after the setting of one of the pressure switches, automatic setting of the other pressure switch takes place with an identical parameter x.

7. The method according to claim 2, wherein tM1=tM2 applies to the measurement periods and wherein tL1=tL2 applies to the opening periods.

8. The method according to claim 7, wherein, after the setting of one of the pressure switches, automatic setting of the other pressure switch takes place with an identical parameter x.

9. The method according to claim 2, wherein, after the setting of one of the pressure switches, automatic setting of the other pressure switch takes place with an identical parameter x.

10. The method according to claim 1, wherein x<10.

11. The method according to claim 10, wherein tM1=tM2 applies to the measurement periods and wherein tL1=tL2 applies to the opening periods.

12. The method according to claim 11, wherein, after the setting of one of the pressure switches, automatic setting of the other pressure switch takes place with an identical parameter x.

13. The method according to claim 10, wherein, after the setting of one of the pressure switches, automatic setting of the other pressure switch takes place with an identical parameter x.

14. The method according to claim 1, wherein tM1=tM2 applies to the measurement periods and wherein tL1=tL2 applies to the opening periods.

15. The method according to claim 1, wherein, after the setting of one of the pressure switches, automatic setting of the other pressure switch takes place with an identical parameter x.

* * * * *